Oct. 4, 1966  N. LAING  3,276,415
DEVICE CONSISTING OF A DRIVE AND A ROTATING WHEEL PRODUCING
THRUST FOR THE PROPULSION OF BOATS
Filed Dec. 11, 1962  7 Sheets-Sheet 5
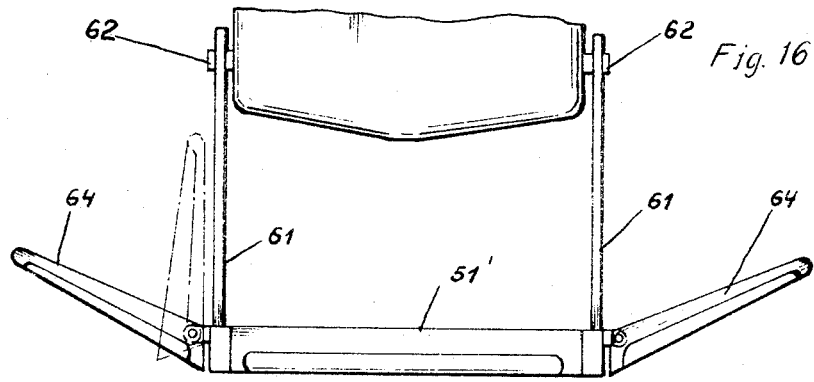
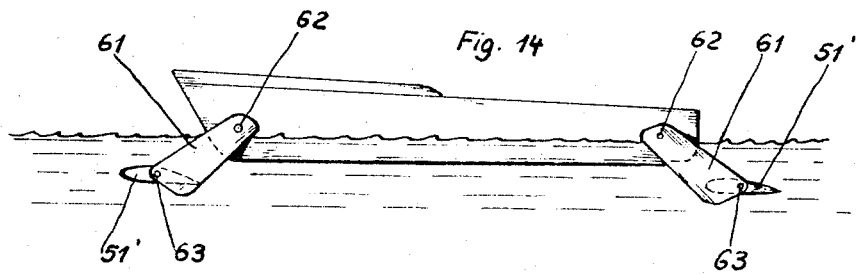
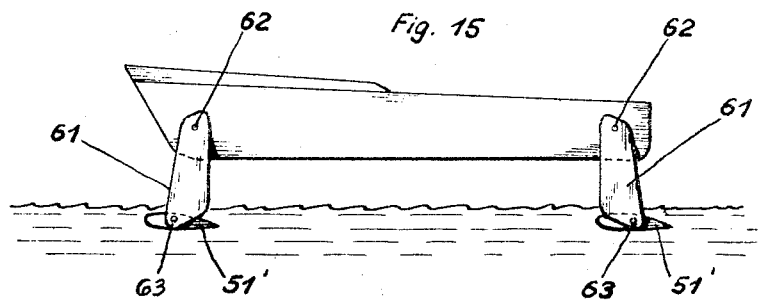
INVENTOR
Nikolaus Laing
BY
Michael S. Straus
ATTORNEY United States Patent Office 3,276,415
Patented Oct. 4, 1966

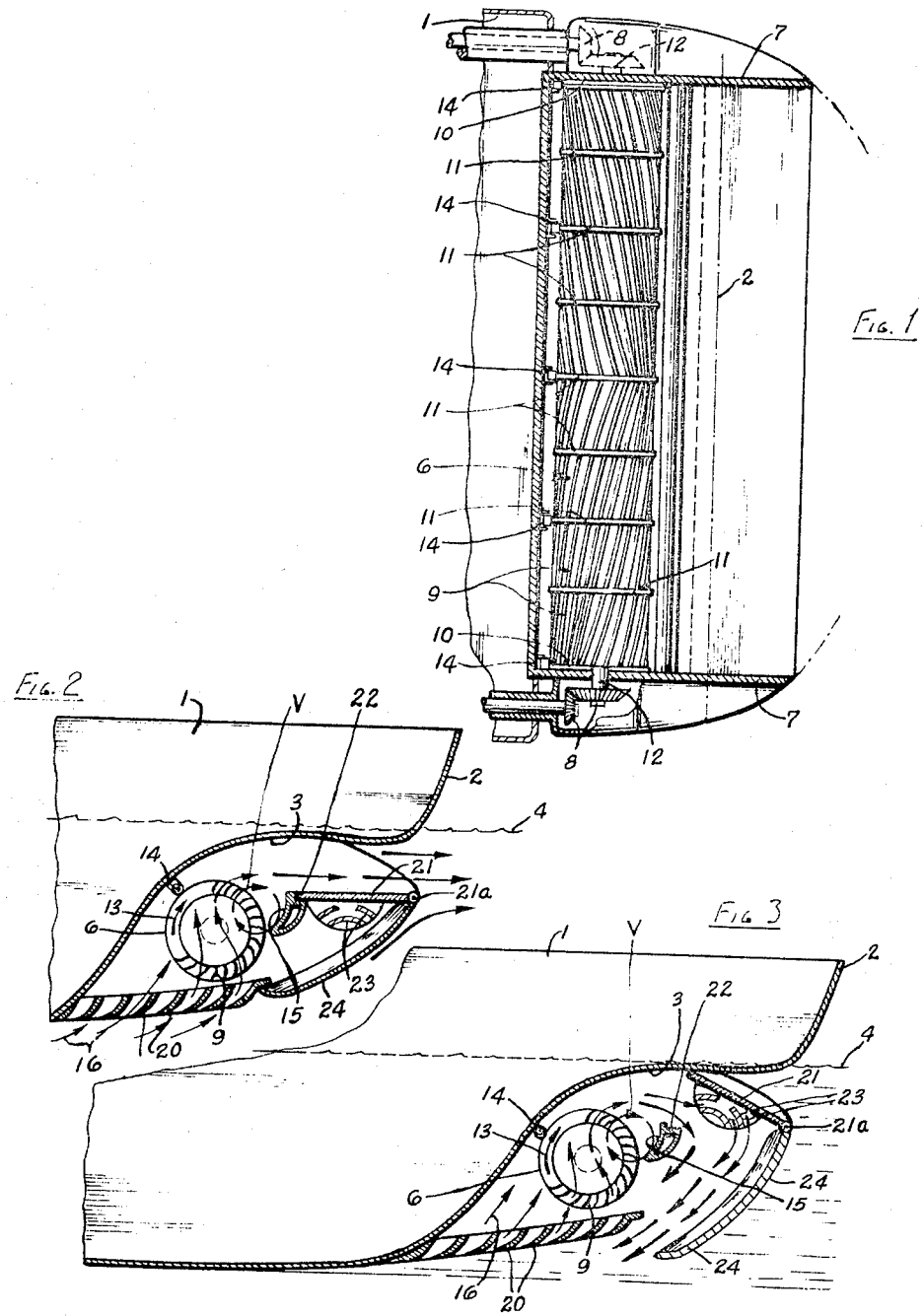

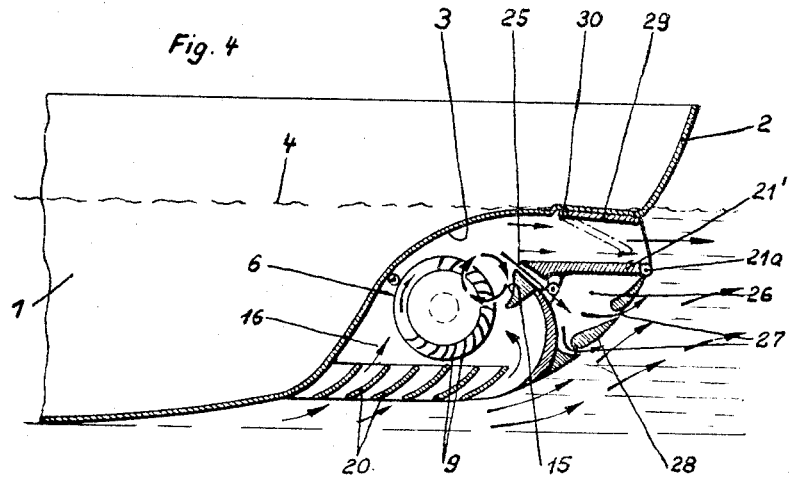

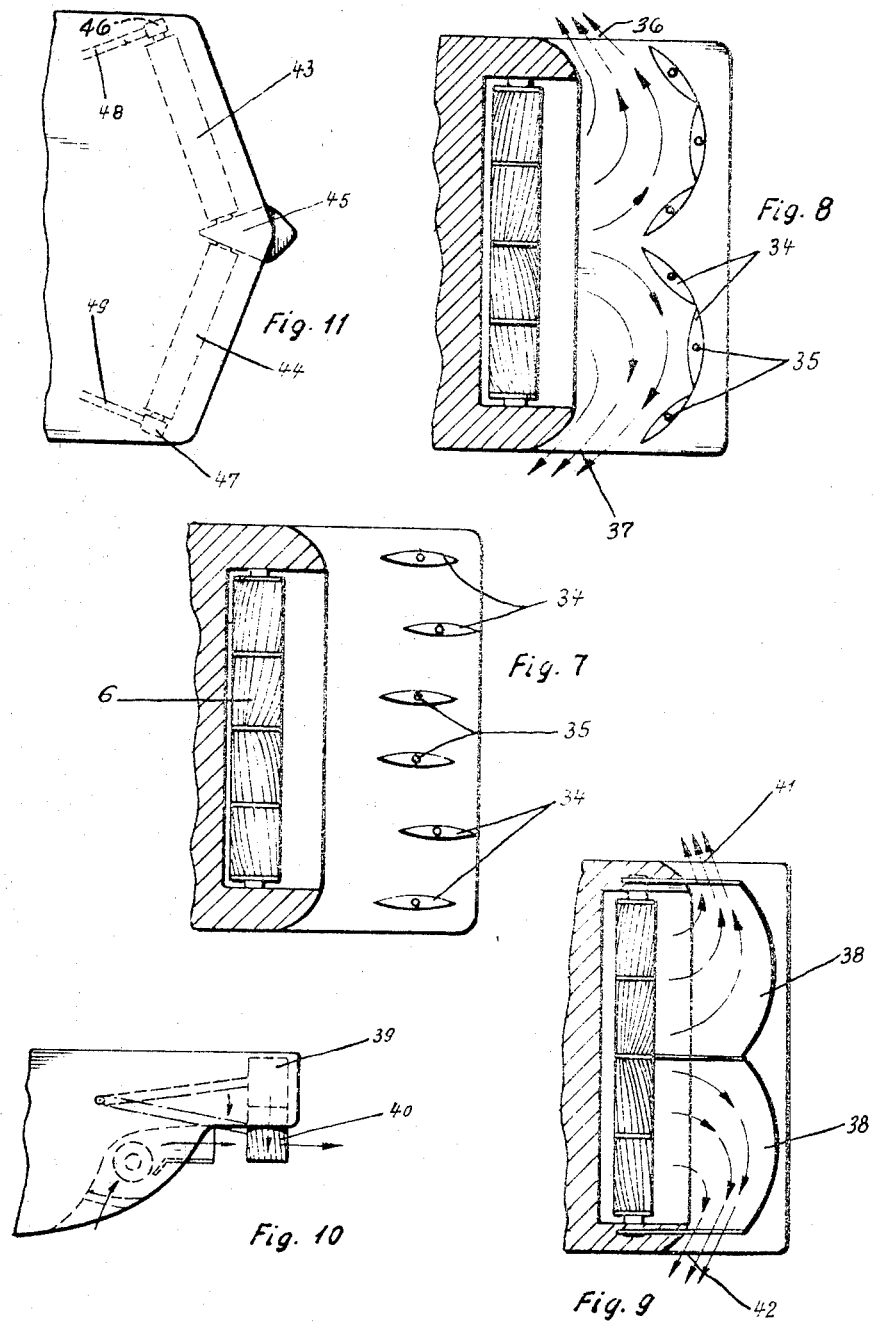

3,276,415
DEVICE CONSISTING OF A DRIVE AND A ROTATING WHEEL PRODUCING THRUST FOR THE PROPULSION OF BOATS
Nikolaus Laing, Stuttgart, Germany, assignor to Firth Cleveland Limited, London, England
Filed Dec. 11, 1962, Ser. No. 243,957
Claims priority, application Great Britain, Dec. 12, 1961, 44,536/61, 44,537/61, 44,538/61
16 Claims. (Cl. 115—16)

This invention relates to a device consisting of a drive and a rotating wheel producing thrust for the propulsion of boats.

According to the invention, this rotating wheel is a cross-flow rotor formed by a drum-shaped blade grid with forward curved blades, the axis of the rotor being horizontal and across or approximately across the longitudinal axis of the boat so that the main part of the rotor lies above the level of the floor of the boat itself or above the level of the floor of parts attached to the boat and completely under the water surface, and the guiding walls which limit the entry duct and outlet duct are so arranged that the water enters from ahead of and/or from underneath the rotor and the outlet is to the rear and above the level of the entry.

In the device according to the invention the forward thrust of the boat may be effected by a flow ejected rearward so as to run along the surface of the water. This flow extends almost over the whole width of the boat. Thus it is possible for a boat of a given draught to achieve a larger stream profile than would be possible with a conventional propeller. The hydraulic power required for the production of a certain thrust is given by the following relationship:

$$N \sim \frac{C}{\sqrt{F}}$$

N representing the required hydraulic power and F representing the effective stream profile cross-sectional area. Thus the geometrical and the effective profiles coincide, and therefore the ratio of effective profile area to geometrical profile area is higher for this device than for the normal propeller.

A further advantage of the propulsion according to the invention is that turbulence due to the stream from the outlet duct of a steady form whereas the normal propeller causes intermittent turbulence.

A further advantage is that contrary to propulsion with a normal boat propeller it is possible to transform the kinetic energy of the inflowing water into static pressure by means of diffusers in the inlet region of the rotor which can then accelerate the water and thus if required it is possible to retransform the static pressure gained in the diffuser back into dynamic pressure in a nozzle, thus using this pressure to once more increase the outlet speed of the stream.

The propulsion device according to the invention can be used for ordinary boats on the one hand, where it is mounted in the bows or at the stern, preferably at the stern, as well as on the other hand for so-called hydrofoil boats, where the propulsion device is mounted in one of the hydrofoils, the lift of the hydrofoil having the effect that the hull of the boat is lifted out of the water when moving. Thus contrary to the known types of hydrofoil boats the propulsive stream may also be used to vary the circulation around the lifting surface thus increasing or decreasing the lift generated.

It is especially advantageous to use so-called tangential rotors for the propulsion devices according to the invention, one of the guiding walls separating entry and outlet ducts and running parallel to the axis of the rotor extending only over a small part of the periphery of the rotor and always positioned at a distance of about the extension of the blades in radial direction from the periphery of the rotor, so that a vortex with a core eccentric to the rotor axis is formed in the interior of rotor, the core position being determined by this guiding wall. A thrust device developed in this way works with especially high efficiency in the region of small Reynolds numbers. In this case the sealing between suction and pressure side is achieved by the vortex core.

A cross-flow pump produces especially kinetic energy. The larger stream profile for a given thrust results in a lower stream speed. The low level of turbulence in the propulsive stream causes far less disturbance than a normal propeller, the turbulence of which projects deeper into the water and hence with our device far less whirling occurs, thus largely preventing damage to the river bed and banks. As a result of the small draught resulting therefrom, this propulsion device may be used almost until the boat is aground.

The invention provides that the propulsion device may be positioned so that it is movable vertically in relation to the boat's hull. Thus it is adaptable to the state of loading of the boat. Thus in the case of hydrofoil boats the propulsion device may also be used while the boat is moving slowly.

It has proved especially advantageous to subdivide the entry diffuser into part diffusers widening in the direction of the stream flow; in this way the diffusers also act as protecting grids.

According to the invention devices may be installed which enable the boat to move backwards. These devices deflect the propulsive stream through about 180°.

When the rotor is a tangential rotor in which the throughput is associated with a vortex with an eccentric core, a strong negative pressure occurs in the centre of this vortex core. Thus it is possible that through the centrifugal effect air bubbles form in the vortex core, thus reducing the efficiency of the propulsion. Therefore the invention provides for devices for sucking off these air bubbles from this core. This procedure may generally be adopted with cross-flow pumps and is not limited to ship propulsion means.

This invention is described in the following figures, but the invention will not be limited by these figures; other embodiments are possible.

FIGURE 1 is a horizontal section through the stern portion of a boat which portion contains the drive means;

FIGURES 2 and 3 are sections through the stern portion taken on a vertical plane running fore and aft, FIGURE 2 showing the drive means in the "ahead" position and FIGURE 3 showing the drive means in the "astern" condition;

Figure 12:
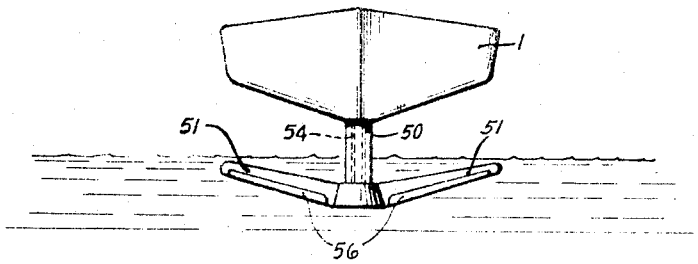
Figure 13:
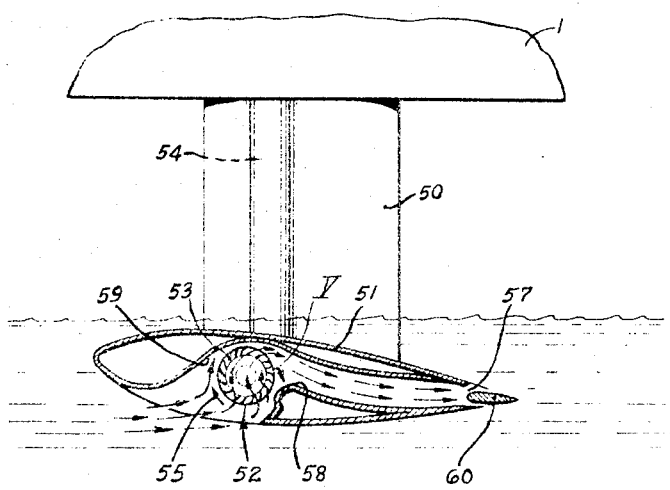
Figure 17:
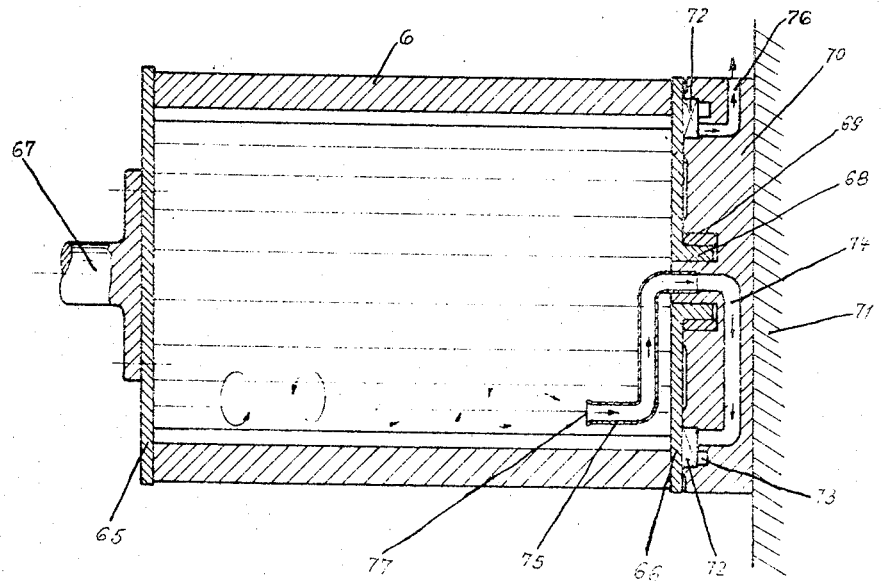
Figures 18, 19:
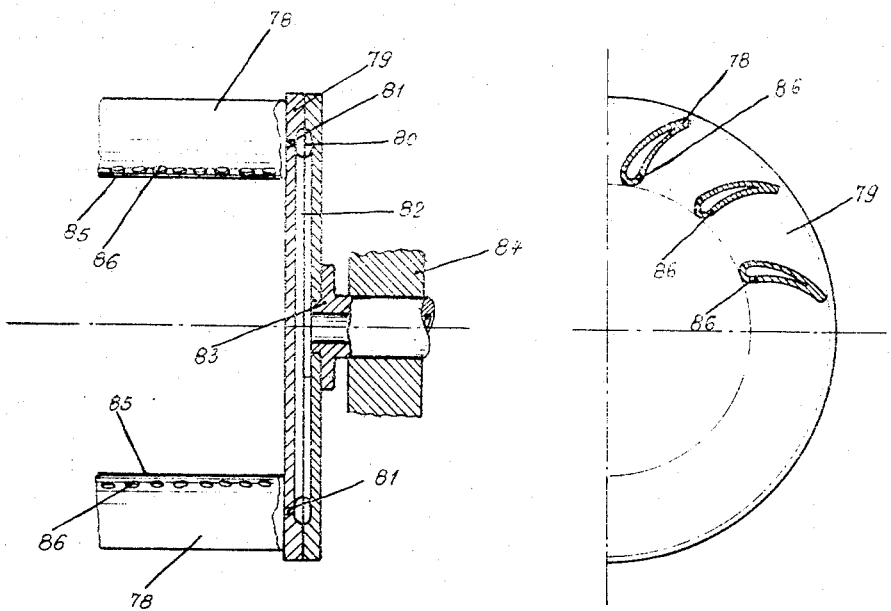
Figure 20:
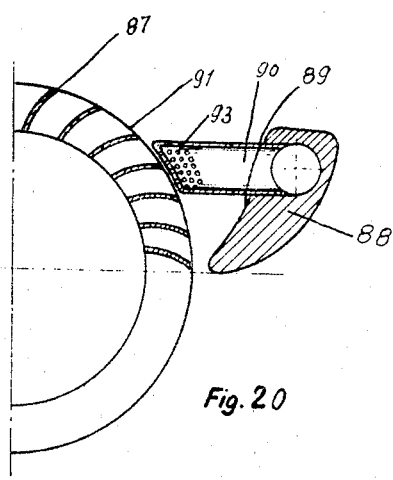
Figure 21:
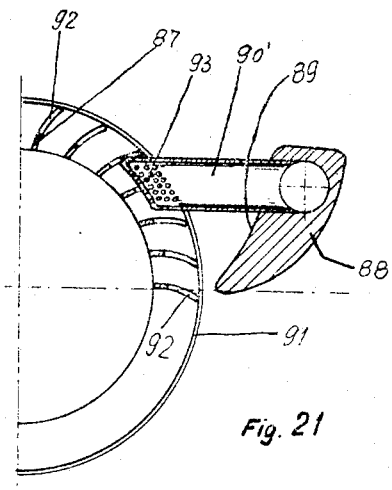
Figure 22:
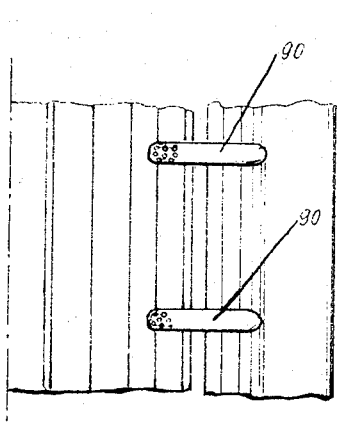
Figure 23:
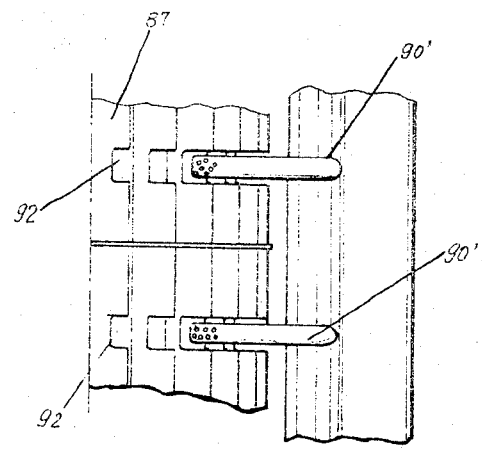

FIGURES 4, 5 and 6 are also sections through the stern portion taken on a vertical plane running fore and aft and showing other arrangements of the device for reversing the boat. FIGURES 4 and 5 show one version of this device. FIGURE 4 shows the arrangement for forward drive, FIGURE 5 shows the arrangement for reverse drive. FIGURE 6 shows a further arrangement for reversing the motion of the boat. The chain dotted lines show the arrangement during reverse drive;

FIGURES 7 and 8 are two horizontal sections of the stern portion of a second form of boat, showing the "ahead" and "astern" conditions of the drive means;

FIGURES 9 and 10 are respectively a horizontal and a fore-and-aft vertical section of the stern portion of a third form of boat showing the "astern" condition of the drive means;

FIGURE 11 is a plan view of the stern portion of a further form of boat;

FIGURE 12 is a front elevation of a hydrofoil boat according to the invention;

FIGURE 13 is a partial diagrammatic section of the FIGURE 12 boat taken on a longitudinal vertical plane slightly to one side of the central vertical plane;

FIGURES 14 and 15 are side elevations of a second form of boat according to the invention in stationary and operating condition respectively;

FIGURE 16 is a front view of the boat of FIGURES 14 and 15, showing a modification;

FIGURE 17 shows the section through a liquid pump with means for moving air bubbles out of the core region. One example of the use of this pump would be for ship propulsion;

FIGURE 18 is a partial transverse section of a rotor for another liquid pump;

FIGURE 19 is a partial axial section of the rotor of FIGURE 18;

FIGURES 20 and 21 show transverse sections of rotor and guide means for a liquid pump, showing further embodiments of the invention;

FIGURES 22 and 23 show plan view of the items shown in FIGURES 20 and 21 respectively.

Referring to FIGURES 1 to 3 of the accompanying drawing, the boat there shown comprises a flat-bottomed hull 1 with a transom stern 2 which is cut away below water line to form a "counter" as indicated at 3. The minimum water line is shown at 4. A rotor 6 runs across almost the whole width of the boat at the stern under the "counter" 3, and is supported on side plates 7 and driven at each end through bevels 8.

The rotor 6 comprises a multiplicity of curved blades 9 extending in a ring longitudinally of the rotor axis. These blades 9 are supported on end discs 10 and are rigidified by intermediate discs 11. The blades are slightly skewed, in one direction to one side of the central vertical plane and in the other direction on the other side. The end discs 10 are mounted on stub shafts 12 journalled in the side plates 7 and driven by the bevels 8 as previously described, the direction of rotation being shown by the arrow 13.

To take the thrust set up on the rotor 6 in operation each end and intermediate disc 10, 11 is backed up by an idler roller 14 journalled in a bracket on the hull.

A guide body 15 is supported between the side plates to extend lengthwise of the rotor 4 at the rear thereof, the cross-section of the guide body being constant over its length and presenting a concave surface to the rotor which for example converges in the direction of rotor rotation. The rotor 6 and guide body 15 co-operate to set up a cylindrical vortex having a core indicated at V which is eccentric to the rotor axis, whereby water is guided twice through the blades 9 of the rotor in a curved path indicated by the flow lines 16. For further information concerning the construction and operation of the rotor 6 and guide body 15, the reader is referred to the patent application No. 671,114, filed on July 5, 1957, now abandoned.

On the intake side of the rotor 6, that is, beneath the rotor, there is mounted a diffuser grid 20 which extends the length of the rotor and performs the duties of converting kinetic energy to static pressure, of preventing stones or rubbish from entering and damaging the rotor and of guiding flow towards the rotor so that at different points along the arc of entry thereto the water approaches the rotor at the optimum angle.

Adjacent the outlet side of the rotor 6 at flat guide plate 21 is pivoted at its rear edge between the side plates 7 as shown at 21a so as to be movable from an "ahead" position where its forward edge rests on a ledge 22 on the guide body 15 and an "astern" position where the forward edge comes against the underside of the "counter" 3. In the "ahead" position the guide plate 21 forms a continuation of the guide body 15 and guides flow from the rotor 6 horizontally and rearwardly. In the "astern" position the plate 21 deflects flow from the rotor downwardly, assisted by a group of bends 23 mounted beneath the plate and of no effect in the "ahead" position thereof.

A guide wall 24 extends parallel to the rotor 6 along its length and is also pivoted at 21a. In its "ahead" position the guide wall 24 forms a continuation of the grid 20. In the "astern" condition the wall 24 is pivoted away from the grid 20 and guides the flow from the rotor forward. An appreciable amount of this water returns to the rotor, although this causes some loss of power the loss is not important as some loss of propulsive effect can be tolerated in astern running.

It will be understood that in normal "ahead" operation the horizontal rearward jet of water produces a forward thrust on the hull 1 through the rollers 14, while in "astern" operation the forwardly directed jet produces reverse thrust. Due to the skew of the rotor blades 9 the rearward jet is slightly divergent.

FIGURES 4 and 5 show an alternative unit, sectioned after the manner of FIGURES 2 and 3, similar parts retaining the same reference number. FIGURE 4 shows the arrangement in the "ahead" position demonstrating a special arrangement whereby some water at high pressure is taken by a catch diffuser 25 from the pressure side and ducted into a chamber 26 from which it is ejected tangential through nozzles 27 for boundary layer control, thereby preventing flow separation and in so doing reducing the drag of the fairing 28.

A flap 29 pivoted at 30 is incorporated to facilitate variation of outlet nozzle area.

FIGURE 5 shows the arrangement in the "astern" position.

FIGURE 6 shows another method for reversing flow which in this case is achieved by means of an elbow or curved plate 31 which extends over the whole length of the rotor. Part 31 is supported by parallel swinging arms 32 (only one being shown). A fairing 33 is arranged behind the elbow 31. The arrangement of the elbow 31 for reverse flow is shown by chain dotted lines.

FIGURES 7 and 8 illustrate a boat seen from underneath having a hull 1, transverse rotor 6 arranged under a "counter" (not shown) and co-operating with a guide body (also not shown) whereby in operation to generate a rearward horizontal jet of water. The elements mentioned are similar to those described above and will need no further description, though it will be appreciated from the drawing that the arrangement of these parts is a little different from that of FIGURES 1 to 6 in particular the "counter" has a longer rearward overhang.

Six similar streamline rudders 34 are mounted for angular movement about vertical spindles 35 projecting downwardly under the counter; in "ahead" operation the rudders 34 are linked for similar angular movement, and operate as conventional rudders. In "astern" operation the rudders 34 are no longer linked but arranged in two sets of three to deflect the rearward jet from the rotor 6 in a horizontal plane so that it forms two streams 36, 37 directed forwardly and outwardly to either side of the boat.

FIGURES 9 and 10 show a further reversing arrangement where elements previously described are given the same numerals and need not be further commented upon. As in the embodiments of FIGURES 7 and 8 the counter 3 has a long overhang. A pair of similar arcuate deflectors 38 are mounted adjacent the stern for vertical movement between a retracted position 39 (FIGURE 10) where they have no effect and an operative position 40 where like the rudders 34 of FIGURES 7 and 8 they deflect the rearward jet from the rotor 6 in a horizontal plane so that it forms two streams 41, 42 directed forwardly and outwardly to either side of the boat.

In any of the previously described embodiments the rotor 6 may be divided into two halves, each half being driven separately. FIG. 11 illustrates an embodiment where two similar rotors 43, 44 are supported at their ends between a central body 45 and bearings 46, 47 at either side of the boat. The rotors are driven independently adjacent the bearings 46, 47 by chains or belts 48, 49. The rotors are angled to produce divergent streams facilitating control of the boat. Reversing means (not shown) may be provided operable independently for each rotor.

FIGURES 12 and 13 show a boat having a hull 1, a pair of hollow pillar-like support members 50 of streamline section extending downwards from the hull in the central vertical plane thereof at spaced points in that plane (only one member 50 is seen in the drawings). Each support member 50 carries a pair of similar hollow bodies 51 which are of hydrofoil section and extend transversely of the central vertical plane of the boat. The hydrofoil bodies 51 project freely from either side of the lower end of the support member 50 and extend outwards and slightly upwards, each body making an angle of some 10–15° to the horizontal. Each hydrofoil body 51 tapers slightly in thickness going outwardly from root to tip: the cross-section at all points along the length of each body is similar to that shown in FIGURE 13, and is oriented so as to produce lift on the body in forward motion of the boat. A rotor 52 is rotatably mounted in each hydrofoil body 51 with its axis of rotation extending lengthwise thereof and is driven from drive means (not shown) in the hull 1 through a shaft 54 extending vertically through the corresponding support member 50 and gearing (not shown) at the lower end thereof, each shaft 54 driving two rotors. Each rotor 52 comprises a series of blades 53 mounted in a ring between end members (not shown); the blades are carried facing the direction of rotation indicated by the arrow 55. An inlet 56 is formed on the underside of each hydrofoil body 51 near the leading edge thereof, and the rear of the body is open to form an outlet 57, inlet and outlet extending lengthwise of the body over the length of the corresponding rotor 52. A pair of guide walls 58, 59 is mounted within each hydrofoil body 51, each guide wall extending over the whole length of the corresponding rotor 52 and running between inlet 56 and outlet 57.

At the inlet 56 the walls merge smoothly with the underside of the hydrofoil body 51, while at the outlet 57 they converge slightly to provide a nozzle. Intermediately, the walls 58, 59 co-operate with the rotor 52 to set up a cylindrical vortex V which is eccentric to the rotor axis whereby to guide flow in a curved path twice through the blades of the rotor. On each hydrofoil body 51 a flap 60 is pivoted over the length of the outlet 9 midway in its width, and control means (not shown) are provided to enable an operator to pivot the flap so as to change the direction of the flat jet of water which issues from the outlet. Automatic means are provided to control the four flaps in relation to one another to keep the hull on even keel, and at a suitable height above the water.

When the boat is stationary, the hull 1 is water-borne, but when the rotors 52 are started up the lift produced by slight downward deflections of the flaps 60, brings the hull out of the water.

FIGURES 14, 15 and 16 show a modified form of boat where two hydrofoil bodies 51′ extending the whole width of the hull 1 are mounted between arms 61 which depend from either side thereof and contain the necessary drive connections for rotors (not shown) mounted one in each hydrofoil body. The arms 61 are pivoted to the hull at 62 and to the hydrofoil bodies 51′ at 63: Thus when starting off in shallow water the hydrofoil bodies can be brought to the FIGURE 14 position so as to reduce draft, while in normal operation the arms 61 are brought to extend vertically as shown in FIGURE 15 whereby to lift the hull as far as possible above water level. Draft can be reduced still further in the stationary condition by pivoting up the arms from the FIGURE 14 position until the hydrofoil bodies 51′ are only just in the water. The cross-section and operation of the hydrofoil bodies 51′ is as described with reference to FIGURES 12 and 13.

FIGURE 16 illustrates a further modification wherein additional hydrofoil bodies 64, each similar to the body 51 of FIGURES 12 and 13, are pivotally supported on the arms 61. The hydrofoil bodies 64 can fold against the arms when for example the boat is brought alongside a quay—this position is shown chain dotted at the left of FIGURE 16—but in their normal operative positions, shown in full lines, they form extensions of the bodies 51′.

It has been found that in liquid pumps the region of lowest pressure tends to cause dissolved or entrained gases to collect in the vortex core, and this may adversely affect the performance of the pump.

Accordingly the invention comprises a "tangential" pump having means providing orifices adapted to be located in the vortex core and connected to a source of pressure lower than that obtaining in the core, whereby to remove any gases which would otherwise collect at the core. The orifice providing means may be the blades themselves, which in this case are hollow, or they may be thin hollow stationary bodies projecting into the vortex core.

FIGURE 17 shows a section through a rotor 6 of a fluid pump with end plates 65 and 66. The rotor is driven by a shaft 67 fixed on end plate 65. End plate 66 is rotatably mounted by a hollow shaft 68 in a journal 69, for example a Phosphor bronze bush, mounted in a fixed plate 70 which can be attached to supporting structure 71, for example the hull of a ship.

A plurality of radial blades 72 form part of end plate 66 and operate in conjunction with channel 73 in the fixed plate 70. This manner of pump is already known and therefore need not be further described. The inlet channel 74 of this pump is connected to a hollow probe 75, the mouth of which is situated at one end of the vortex core. The pressure channel 76 exhausts the air through the fixed plate 70.

The mouth 77 forms a "sink" (c.f. aerodynamic sink) so removing air bubbles from the pump.

The rotor of FIGURES 18 and 19 has hollow blades 78 mounted between end discs 79 of which only one is shown. One of these end discs has an annular duct 80 communicating with the space within each of the blades 78 by means of bores 81; the duct is connected by radial bores 82 to a hollow supporting shaft 83 journaled in a stationary bearing 84. The space within the supporting shaft is connected to a suction source (not shown) through a gland (also not shown).

On either side of the leading edge 85 of each blade 78 is formed a row of evenly spaced small sucking orifices 86 which extend over the whole length of the blade.

In operation of the rotor and guide means a vortex is formed having a core which interpenetrates the rotor blade ring. As the blades 78 pass in turn through the vortex core the orifices 86 suck gases therefrom and thereby maintain the effectiveness of the pump.

The suction source will naturally have a pressure appreciably lower than that of the vortex core.

By having the orifices 86 on either side of, rather than at, the leading edges 85 of the blades there will be less tendency for foreign matter to lodge in them.

In the construction of FIGURES 20–23 the rotor blades 87 are solid; the co-operating guide body, illustrated at 88, presents a concave surface 89 converging with the rotor in the direction of rotor rotation and is hollow. Very thin hollow vanes 90 and 90′ of streamline section extend from the surface 89. The vanes 90 extend almost up to the outer envelope 91 of the rotor blades. The vanes 90′ extend into recesses 92 in the blades. The vanes are disposed at regular intervals over the length of the rotor and are oriented to cause minimum obstruction to flow. Each vane presents a group of orifices 93 in either face as near as possible to the core region. The interior of each vane is connected, through the hollow body 88, with a source of suction.

In operation a vortex is formed as previously mentioned in connection with the construction of FIGURES 2 to 5. The sucking orifices 93, which are located well within the vortex core, remove gases which would otherwise tend to collect there and impair the performance of the pump.

What I claim is:

1. In a floating object having a body partly submerged below the water line and propulsion means below said water line for driving said object, the improvement whereby said propulsion means comprises a cross-flow rotor journaled on said body substantially transversely to the direction of motion, the submerged part of said body forming an enclosure around said rotor having an inlet opening extending through said body below and forwardly of said rotor and an outlet opening higher than said inlet opening and situated rearwardly of said rotor just below the water line.

2. In a floating object having a body partly submerged below the water line and propulsion means below said water line for driving said object, the improvement whereby said propulsion means comprises a generally cylindrical cross-flow rotor horizontally journaled on said body substantially transversely to the direction of motion, the submerged part of said body forming an enclosure around said rotor having an inlet opening extending through said body, forwardly of and below the rotor axis and an outlet opening rearwardly of and above the rotor axis just below the water line.

3. The improvement defined in claim 2 wherein said rotor comprises an annular array of blades separated by generally longitudinal gaps, said enclosure including a guide wall with a cylindrically concave surface confronting said rotor intermediate said inlet and outlet openings for generating along said surface a horizontally cylindrical vortex permeating said gaps along an adjacent rotor portion.

4. The improvement defined in claim 3 wherein said blades are curved radially outwardly in the direction of rotation of said rotor.

5. The improvement defined in claim 3 wherein said rotor is provided with suction means for aspirating air inclusions adjacent the periphery of said rotor.

6. The improvement defined in claim 5 wherein said blades are provided with longitudinal edges having a series of orifices spaced therealong, said orifices forming part of said suction means.

7. The improvement defined in claim 3 wherein said blades are helicoidally twisted about the rotor axis.

8. The improvement defined in claim 7 wherein the twist of each blade is symmetrically reversed on opposite sides of a transverse median plane of the rotor.

9. The improvement defined in claim 3 wherein said rotor further comprises a pair of end plates and at least one intermediate plate parallel to said end plates, all of said plates supporting said blades.

10. The improvement defined in claim 3, further comprising adjustable deflecting means at said outlet opening positionable to redirect an outgoing flow in a generally forward direction for reversing the sense of locomotion of said object.

11. The improvement defined in claim 10 wherein said deflecting means comprises movable partition means in said enclosure for blocking said outlet opening and guiding the outgoing flow from said vortex through a rear portion of said inlet opening.

12. The improvement defined in claim 3 wherein said enclosure forms a chamber below said outlet opening bounded by a fairing, said chamber being provided with an entrance passage open toward said rotor in the region of said vortex and with at least one exit port at said external surface for directing fluid from said chamber substantially tangentially upwardly along said fairing.

13. The improvement defined in claim 12 wherein said fairing is constituted by adjustable baffle means selectively positionable to block said exit port.

14. The improvement defined in claim 2 wherein said inlet opening is provided with an entrance grid composed of longitudinally extending vanes.

15. The improvement defined in claim 14 wherein said vanes diverge in the direction of incoming flow.

16. In a boat having a partly submerged hull with an overlying stern portion substantially at the water line and propulsion means below said water line for driving said boat, the improvement whereby said propulsion means comprises a generally cylindrical cross-flow rotor horizontally journaled on the submerged part of the hull substantially transversely to the direction of motion, said submerged part and said stern portion forming an enclosure around said rotor having an inlet opening extending through said body, forwardly and below the rotor axis and an outlet opening rearwardly of and above the rotor axis just below the water line.

References Cited by the Examiner

UNITED STATES PATENTS

| 120,264 | 10/1871 | Godfrey | 115—16 |
| 408,310 | 8/1889 | Lobdell | 115—16 |
| 2,243,800 | 5/1941 | Goodyear | 60—35.54 |
| 3,155,071 | 11/1964 | Buttner | 115—16 |

FOREIGN PATENTS

| 24,672 | 1907 | Great Britain. |
| 619,722 | 3/1949 | Great Britain. |
| 559,024 | 1/1958 | Belgium. |
| 1,278,376 | 10/1961 | France. |

MILTON BUCHLER, *Primary Examiner.*

FERGUS S. MIDDLETON, *Examiner.*

T. M. BLIX, *Assistant Examiner.*